(12) United States Patent
Schmidt et al.

(10) Patent No.: US 8,731,586 B2
(45) Date of Patent: May 20, 2014

(54) METHOD AND SYSTEM FOR BLOCKING UNDESIRABLE MESSAGES

(75) Inventors: Andreas Schmidt, Braunschweig (DE); Markus Trauberg, Velchede (DE); Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 44 days.

(21) Appl. No.: 10/523,064

(22) PCT Filed: Jul. 7, 2003

(86) PCT No.: PCT/EP03/07280
§ 371 (c)(1),
(2), (4) Date: Nov. 2, 2005

(87) PCT Pub. No.: WO2004/015939
PCT Pub. Date: Feb. 19, 2004

(65) Prior Publication Data
US 2006/0135184 A1 Jun. 22, 2006

(30) Foreign Application Priority Data
Aug. 2, 2002 (EP) .................................. 02017412

(51) Int. Cl.
*H04W 4/00* (2009.01)
(52) U.S. Cl.
USPC ..... 455/466; 455/411; 455/412.2; 455/414.3; 455/415; 455/567
(58) Field of Classification Search
USPC ............... 709/204, 238; 455/466, 412.2, 560, 455/411, 414.3, 415, 567; 370/389
See application file for complete search history.

(56) References Cited

U.S. PATENT DOCUMENTS

| | | | | |
|---|---|---|---|---|
| 6,101,393 | A * | 8/2000 | Alperovich et al. | 455/466 |
| 2002/0044634 | A1 * | 4/2002 | Rooke et al. | 379/93.01 |
| 2002/0110227 | A1 * | 8/2002 | Bedingfield et al. | 379/88.19 |
| 2003/0123631 | A1 * | 7/2003 | Moss et al. | 379/210.02 |
| 2004/0097248 | A1 * | 5/2004 | Schmidt et al. | 455/466 |
| 2004/0157590 | A1 * | 8/2004 | Lazaridis et al. | 455/415 |

FOREIGN PATENT DOCUMENTS

| | | |
|---|---|---|
| WO | WO 0051323 A1 | 8/2000 |
| WO | WO01/05118 | 1/2001 |
| WO | WO01/78428 | 10/2001 |
| WO | WO01/91487 | 11/2001 |
| WO | WO02/071774 | 9/2002 |

OTHER PUBLICATIONS

3G TS 23.140 V3.0.1 (Mar. 2000) 3rd Generation Partnership Project; Technical Specification Group Terminals; Multimedia Messaging Service (MMS); Functional description; Stage 2 (Release 1999).*

(Continued)

*Primary Examiner* — Marcos Torres
(74) *Attorney, Agent, or Firm* — King & Spalding L.L.P.

(57) ABSTRACT

The present invention relates to a method for blocking undesirable messages (MMs), which includes the following steps: a message is sent from a sender (MMS UA A) to a transmitter (MMS R/S A); the message is sent from the transmitter (MMS R/S A) to a service (MMSE SP B); the message is transmitted from the service (MMSE SP B) to a recipient (MMS UA B), such recipient being serviced by the service provider. The message is transmitted from the service provider only if the sender does not figure on a list of exclusions. Preferably, the list of exclusions is managed by the service.

18 Claims, 5 Drawing Sheets

(56) References Cited

OTHER PUBLICATIONS

ETSI TS 122 140, V5.2.0 (Jun. 2002), "Universal Mobile Telecommunications System (UMTS)"; Service aspects; Stage 1; Multimedia Messaging Service (3GPP TS 22.140 version 5.2.0 Release 5).

3GPP TS 23.140, V5.3.0 (Jun. 2002), "3rd Generation Partnership Project"; Technical Specification Group Terminals; Multimedia Messaging Service (MMS); Functional description; Stage 2 (Release 5).

* cited by examiner

METHOD AND SYSTEM FOR BLOCKING UNDESIRABLE MESSAGES

BACKGROUND OF THE INVENTION

Such methods or systems can be used, for example, in mobile radio service systems, such as, for instance the GSM (Global System for Mobile Communications) System.

In addition to voice telephony, the GSM mobile radio system also offers the option to send or to receive short text messages of up to 160 characters in length. This service is known as SMS (Short Message Service) and is described in the technical specifications TS 23.040 Version 5.4.0, Release 5, "Technical Specification Group Terminals; Technical Realization of the Short Message Service (SMS)" of the 3rd Generation Partnership Project (3GPP).

A multimedia capable variant of a mobile messaging service, the so-called MMS (Multimedia Messaging Service) service is currently being standardized for the next generation mobile radio systems (2.5G and 3G) such as, for example, UMTS (Universal Mobile Telecommunication Systems). This MMS Service is specified in the technical specifications TS 22.140 Version 5.2.0, Release 5, "Technical Specification Group Services and Systems Aspects; Service Aspects; Stage 1; Multimedia Messaging Service (MMS)" and TS 23.14 0 Version 5.3.0, Release 5, "Group Terminals; Multimedia Messaging Service (MMS), Functional Description; Stage 2" of the 3rd Generation Partnership Project (3GPP). Messages with a multimedia content hereinafter will be called MMs to differentiate them more clearly from the SMS text messages. As opposed to SMS, there is no limitation placed on pure text content in the MMS. With MMS it will be possible to format texts according to individual taste as well as to embed audio and visual content in a message. Thus, an MM can be made up of several MM elements from different file types (e.g., audio or still frame) or file formats (with the still frame, for example, the so-called "Graphics Interchange Format" GIF or "Joint photographic expert group" JPEG).

FIG. 1 shows a known MMS network architecture. Hereinafter, a so-called "MMS-User Agent" will be called an MMS UA. The MMS UA can be a software program, for instance on a mobile radio service set or on a device such as laptop or suchlike connected to a mobile radio service set, which is MMS capable. In FIG. 1, a distinction is made between a User A and a User B. Correspondingly, there is an MMS UA A and an MMS UA B. Hereinafter, with the other network elements, elements A and B are correspondingly differentiated by attaching the letters "A" and "B." FIG. 1 further shows two network elements MMS R/S A or MMS R/S B, which represent so-called "MMS Relay/Server." The MMS R/S A or MMS R/S B are network elements which provide the respective MMS UA with MMS functionality in the MMSE (Multimedia Messaging Service Environment) in the area of the responsibility of the MMS Service Provider SP. Correspondingly, FIG. 1 shows an MMSE SPA or an MMSE SPB.

A characteristic feature of MMS is that when MMs are delivered between the so-called "Push Mode", whereby an incoming MM is delivered to the recipient immediately, and the so-called "Pull Mode," whereby the recipient is first notified of the arrival of a new MM and then can make his/her own decision as to when or whether he/she downloads this MM to his/her terminal unit. FIGS. 2 and 3 show the difference between Pull and Push Mode in the delivery of an MM. With the Pull Mode according to FIG. 2, first a notification goes from the MMS R/S to the MMS UA to the effect that there is a message, whereas with Push Mode according to FIG. 3 the message is transmitted immediately.

FIG. 4 shows a known network architecture with defined interfaces for connecting further network elements to an MMS R/S. In addition to the interface MM1, via which the MMS UA and MMS R/S are connected to each other, as many external computers as desired (i.e., servers, such as, for example, e-mail server, fax server, etc.) can be connected to an MMS R/S via the interface MM3. The interface MM4 is used to connect external MMS Service Providers. The interface MM5 connects the MMS R/S with the HLR (Home Location Register) of the network operator, in which register the individual subscriber data of each customer is stored. The HRL is thereby within the network operator's area of responsibility. The interface MM6 enables one or several MMS user databases to be connected. Through the interface MM7 it is possible to connect further servers which make value-added services from a value-added service provider available to MMS users.

The MMS can be individualized if so desired. Based on individual user settings, an MMS R/S can have certain MMs treated in a special way. Thus, for example, MMs that belong to a specific MM category e.g., personal MMs) can be immediately forwarded by the MMS R/S; i.e., without the MM UA being notified to an e-mail address predetermined by the user. Further, MMs that have specific keywords in the title also can be automatically deleted by the MMS R/S, or MMs that come from a particular sender can be delivered immediately, that is in Push Mode, to the MMS UA, while the usual delivery method desired for all other MMs is the Pull Mode. Over and above that, other personal rules are conceivable.

However, all rules have the disadvantage that the MMS user has to have already defined them before the MMs arrive in the MMSE of his/her MMS Service Provider. This can be done either when the contract is made or, during the contract term, by phone or by using (mobile) "web browsing." The individual rules for personalizing the MMS are usually managed in the MMS user database, which the MMS R/S can access via the interface MM6.

In the MMS, a sender also has the option of sending his/her MMs anonymously. Comparisons with other services where the sender can remain anonymous to the recipient, such as, for example, the traditional letter post, show, however, that in individual cases, misuse can occur in the form of undesirable promotions, offensive material and suchlike. Misuse also may not be excluded with anonymous MMs.

Although the recipient can set up a filter on his/her MMS UA to sort out the MMs that reach him/her from undesirable senders. However, this has the disadvantage that the filter functionality does not come into play until after transmission of the MM or the notification via the valuable air interface. Depending on the type of account he/she has with his/her service provider, the data that was transmitted contrary to his/her desire is already invoiced to the recipient at this point in time. Further, there is the disadvantage that MMs sent anonymously do not have the filter criteria. There is no known criteria whereby filtering should be done if, for example, the identity of the sender is not known to the MMS UA or if the alias name given can only be assigned to the actual sender temporarily; i.e., only for one single MM.

The invention thus seeks to provide a method and a system for blocking undesirable messages, such method and system efficiently rejecting undesirable messages and thereby keeping the number of messages to be transmitted via the valuable air interface to a minimum.

SUMMARY OF THE INVENTION

As such, a method according to the present invention for blocking undesirable messages includes the following steps:
a message is sent from a sender to a transmitter,
the message is sent from the transmitter to a service provider, and
the message is transmitted from the service provider to a recipient,
whereby the recipient is served by the service provider.

The message is transmitted from the service provider to the recipient only if the sender does not figure in a list of exclusions. The sender may, for example, be an MMS UA and the transmitter an MMS R/S. The recipient is preferably registered with the service provider; in other words, he/she is under contract to the service provider. Using this method, in the future, only messages from senders who do not figure in a list of exclusions will be transmitted to the recipient via the air interface.

Preferably, the list of exclusions is managed by the service provider. This has the advantage that the service provider always knows which senders are excluded from sending to certain recipients or groups of recipients. In a preferred embodiment of the present invention, the list of exclusions is the recipient's personal, or individually compiled list of exclusions. In this case, the service provider manages a personal list of exclusions for each recipient, such list being consulted before an incoming message is transmitted to the recipient via the air interface.

In a further embodiment of the present invention, the list of exclusions is a general list of exclusions, which is consulted for all recipients and/or groups of recipients. It is possible that a general list of exclusions may be managed by the service provider. Senders whose messages should never be sent to any recipient and/or groups of recipients whatsoever via the air interface are put on this list of exclusions. Thereby, the service provider can determine according to his/her own criteria which persons or recipients can put senders on a corresponding general list of exclusions or how the groups of recipients are made up. Personal and general lists of exclusions also may be combined.

In a further embodiment of the present invention, the recipient notifies the service provider if he/she wants to have a sender put on the list of exclusions. It is possible for the recipient to draw up his/her list of exclusions him/herself. To this end, the recipient notifies the service provider which sender he/she wants to have put on the list of exclusions. Alternatively, it is also possible for only the service provider itself to have senders put on a list of exclusions.

In a further embodiment of the present invention, the recipient receives the message anonymously and notifies the service provider if he/she wants to have the sender of the message placed on the list of exclusions. In such a case, the sender is not known to the recipient. If, nevertheless, the recipient does not wish to receive any more messages from this sender, for instance, because the messages are promotional messages, then the recipient can notify the service provider of this. The service provider knows the name of the sender, but just does not pass this name onto the recipient. Thus, it is possible for the service provider to place the name of the sender on the list of exclusions.

In a further embodiment of the present invention, the recipient receives the message with an alias name and notifies the service provider if he/she wants to have the sender of the message placed on the list of exclusions. Similarly to when messages with an anonymous sender are received, when a message with an alias name is received the recipient does not know who the actual sender is. If, nevertheless, the recipient does not wish to receive any more messages from this sender, then again the recipient can notify the service provider of this, the actual sender being known to the service provider. Accordingly, the service provider can put this sender on the list of exclusions, so that in the future the recipient will not receive any more messages from this sender. Thus, again, the air interface to the recipient is freed.

In another embodiment, the notice to the service provider is formed as a self-contained, or so-called "abstract message." It is further preferred that the notice to the service provider is integrated in the abstract message in the form of an information element.

In a further embodiment, the notice to the service provider is contained in an MM, particularly in the user data of the MM.

The notice to the service provider also may contain further information for the filter functionality; in particular the type of the list of exclusions and/or time limitations.

In yet another embodiment, the notice to the service provider contains an identification signal from which the service provider can determine the identity of the sender. If the recipient has only received the anonymous message or the message with the alias name, the problem arises as to how the recipient can notify the service provider as to which sender should be put on the list of exclusions. In such a case, along with his/her notice, the recipient sends the service provider an identification signal by which the message or the sender can be unequivocally identified. Thereby, preferably a message identifier and/or the alias name are used as an identification signal. The message identifier can be a reference to the storage location of the message, the so-called URI (Uniform Resource Identifier), from the notification, or it can be a message ID, from the delivery of the MM.

A system for blocking undesirable messages is also provided by the present invention. The system includes a transmitter that can send a message from a sender, a service provider that can receive the message from the transmitter and a recipient served by the service provider, whereby the recipient can receive the message from the service provider. Thereby, the service provider can transmit the message to the recipient only if the sender does not figure in the list of exclusions.

The present invention further relates to a terminal unit, in particular a mobile radio service terminal unit for use with a method according to the present invention and/or for use in a system according to the present invention. The present invention further relates to a transmitting/receiving device, in particular a mobile radio service base station for use with a method according to the present invention and/or for use in a system according to the present invention.

An advantage of the present invention is that the incoming MMs can be examined before they are notified or before they are delivered to see whether the sender of the MM figures on a private and/or public list of exclusions of the recipient. In this way, the data traffic (especially via the limited resources of the air interface) is reduced, which leads to lower costs.

A further advantage is that even in the event of MMs sent anonymously, a filter functionality is effective as the identity of the sender is known to the MMS Service Provider as opposed to the recipient.

Finally, it is advantageous that a recipient can dynamically extend his/her list of exclusions by new entries any time after a notification has been received or after an MM has been delivered.

Additional features and advantages of the present invention are described, and will be apparent from, the following Description of the Invention and the Figures.

DETAILED DESCRIPTION OF THE INVENTION

Figure 5:
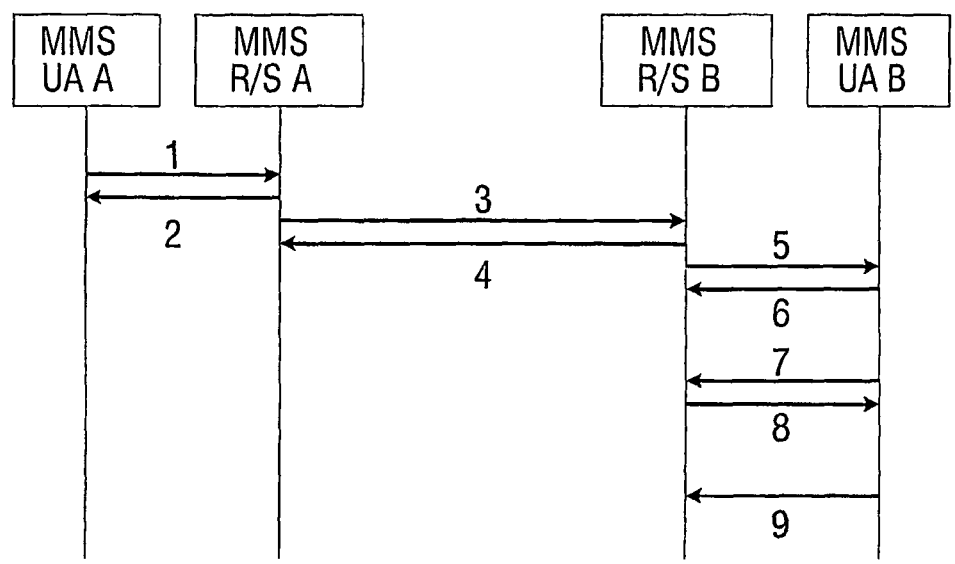
FIG. 5 shows a diagrammatic view of an MM being sent from an MMS UA A to the MMS UA B.

FIG. 5 shows an exemplary embodiment of an MM being sent from a user MMS UA A to a user MMS UA B via the network elements MMS R/S A and MMS R/S B. The exchange of data between the data transmission units mentioned is to be described in this exemplary embodiment using the so-called "abstract messages;" i.e., short messages defined in the technical specifications TS 23.140 Version 5.3.0, Release 5, "Group Terminals; Multimedia Messaging Service (MMS); Functional Description; Stage 2" of the 3rd Generation Partnership Project (3GPP). An abstract message consists of at least one information element. In the MMS, the sender (i.e., the user A) can send an MM with the abstract message 1 via the air interface MM1 to the MMS R/S A in the MMSE environment of his/her service provider A. The MMS R/S A confirms the correct receipt of the MM from the MMS UA A with the abstract message 2.

The MM is transmitted to the MMS R/S B in the service area B of the recipient with the abstract message pair 3 (contains the MM) and 4 (response). Thereupon, the recipient (i.e., the user B) is notified with the abstract message 5 of the MM ready to be downloaded. This notification contains as reference a URI (Uniform Resource Identifier) of the storage location of the MM. The abstract message 6 serves primarily as confirmation that the user MMS UA B has received the notification correctly and to inform the MMS Service Provider of the delivery mode preferred by the recipient; i.e., Push or Pull Mode. The recipient i.e., the user B) can initiate the download of an MM waiting in the MMS R/S B with the abstract message 7. The MM is then delivered from the MMS R/S B to the MMS UA B using the abstract message 8. In addition to the MM itself, this abstract message also contains an identification element (i.e., the so-called message ID) via which the MM can be unequivocally referenced later for further MMS functionalities both by the MMS R/S B and by the MMS UA B of the recipient. The MMS R/S B can be informed of the outcome of the download via the abstract message 9 from the MMS UA B.

With MMS, a sender has the option of sending his/her MMs anonymously. This function is, for example, of advantage when opinion polls are carried out using MMS or advisory services such as, for instance, debt advice, alcoholics anonymous, etc., are used. There, an information element must be placed accordingly in the abstract message 1 when the MM is sent.

Thereby, the address of the sender is only withheld from the recipient of the MM. As such, the address is withheld in the notification concerning a newly arrived MM ready for downloading in the abstract message 5 and when the MM in the abstract message 8 is downloaded. As a result, the MMS Service Providers concerned still have full knowledge of the identity of the sender. This is necessary so that the MMs can be charged accordingly.

In the case of sender anonymity, the MMS Service Provider can either replace the actual address of the sender in the corresponding information element of the abstract messages 5 and 8 concerned with an alias name or leave it empty. Alternatively it is also possible for the MMS Service Provider to leave out the corresponding information element.

Figure 6:
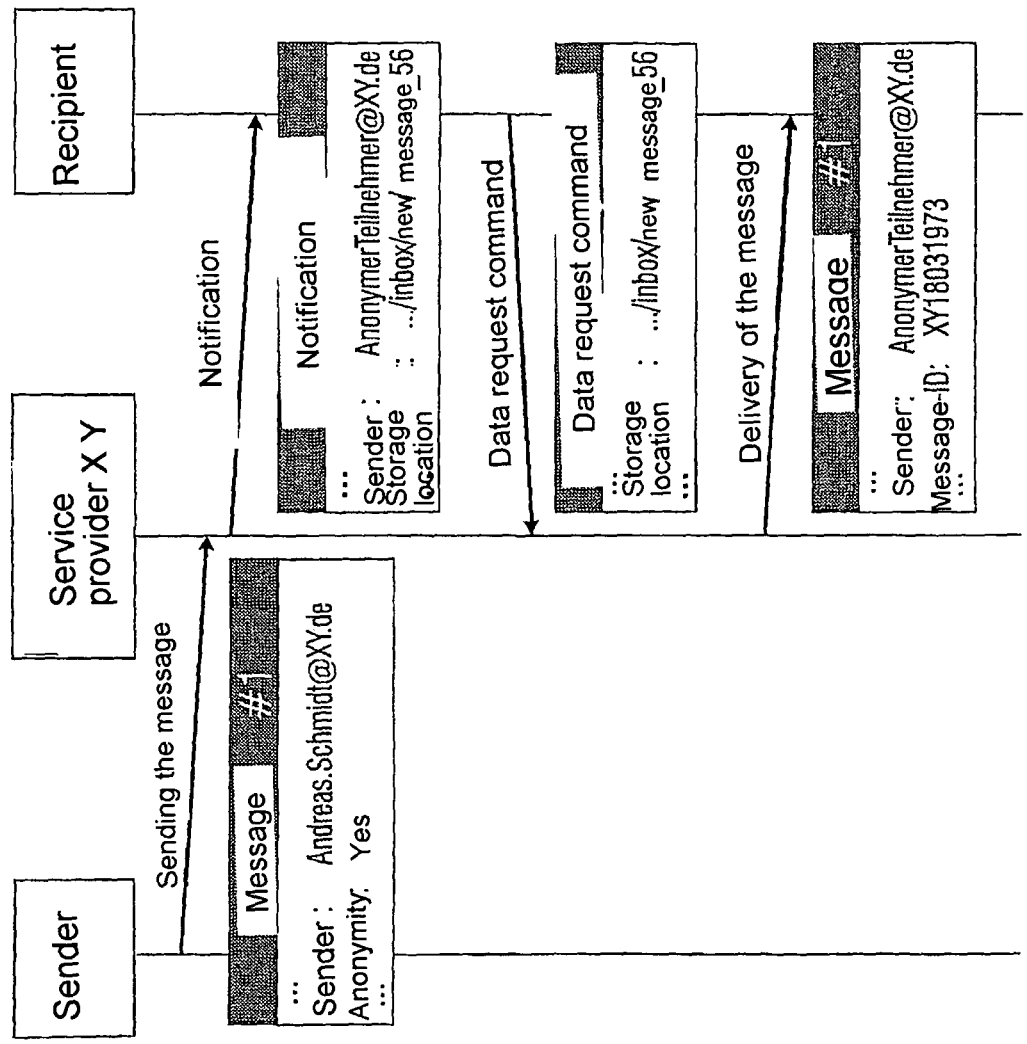
FIG. 6 shows a diagrammatic view an MM being sent anonymously.

FIG. 6 shows an exemplary embodiment of a message #1 being sent from a sender to a recipient. The sender sends the message #1 to a service provider XY. Although the sender has applied for anonymity, the address Andreas.Schmidt@XY.de is known to the service provider XY. The service provider XY subsequently notifies the recipient that a message from an anonymous subscriber is waiting. Using a data request command, the recipient accesses the storage location at the service provider XY. Then the message is sent with an anonymous sender identifier from the service provider XY to the recipient.

In response to a notification or in response to a MM delivered, the recipient can inform his/her MMS Service Provider that in the future he/she does not want to receive any further MMs from the sender of this MM and can do so by sending an appropriate request A to his/her MMS Service Provider. Thereby, one must distinguish between two cases:

1. The identity of the sender is not known

If the sender of an MM remains anonymous, then in one embodiment the request A can contain an identification signal I from which the MMS Service Provider can ascertain the identity of the sender. In response to a notification of a new MM ready to be downloaded, the storage location of the MM (URI) contained in the notification (abstract message 5 according to FIG. 5) can be used as identification signal I. If the request A of the recipient is a response to a message delivered (abstract message 8 according to FIG. 5), then the message ID of the MM can be used as identification signal I.

If the MMS Service Provider has replaced the actual address of the sender by a temporary alias name, it is also possible to use this alias name as identification signal I. As, however, according to the technical specification TS 23.140, Version 5.3.0 Release 5 of the 3GPP, the information element for the sender address does not necessarily have to be transmitted, and it might not be possible later to unequivocally assign the alias name conferred temporarily by the MMS Service Provider to the actual sender, URI or message ID are preferably used as identification signal I.

2. The identity of the sender is known

If the identity of the sender is known, then, as an alternative to the URI (after the notification) or to the message ID (after the MM has been delivered), the address of the sender who is to be placed on the list(s) of exclusions also may be sent to the MMS Service Provider as identification signal I with the request A. As, according to the technical specification TS 23.140, Version 5.3.0 Release 5 of the 3GPP, the information element for the sender address does not necessarily have to be transmitted, it is also the case here that the URI or message ID preferably should be used as identification signal I.

The following table shows which identification signals I can be used in the request A.

| Request A as response to | Notification | | Delivery | |
| --- | --- | --- | --- | --- |
| Sender is | unknown to the recipient | known to the recipient | unknown to the recipient | known to the recipient |
| Identification signal I | URI | Alias name | Sender address | Message ID | Alias name | Sender address |

Further exemplary embodiments of the present invention are explained below. With regard to the messages, reference will be made to the process according to FIG. 5. The sending of an MM on the sender's side proceeds as follows: the sender sends an MM with the abstract message 1 via the interface MM1 to the MMS R/S A in the MMS area A of his/her MMS Service Provider, whereby the sender has the option to inform his/her MMS Service Provider whether or that he/she would like to hide his/her identity from the recipient. The MMS R/S A confirms with the abstract message 2 that the MM has been received correctly. The MM is sent, if necessary with the abstract message pair 3 (contains the MM) and 4 (contains a response), to the MMS R/S B in the MMS area B of the recipient.

In the following exemplary embodiment it is assumed that the recipient is notified of the identity of the sender and that the request A is a response to the MM notification. After the MM has been received in the area of responsibility MMSE B of the MMS Service Provider SP B, first the abstract message 5 notifies the recipient that there is an MM ready to be downloaded. This notification contains the address of the sender (optional), as well as the URI (reference to the storage location) of the MM (obligatory). The abstract message 6 serves primarily as confirmation that the MMS UA B received the notification correctly.

The recipient recognizes from the subject and/or the address of the sender that it involves a promotional offer that is of no interest to him/her and, therefore, the sender sends a request A to his/her MMS Service Provider to have the address of the sender put on a so-called black list, whereby the sender address from the notification is used as identification signal I. The MMS Service Provider SP can put this sender address directly on the personal black list of the recipient. In the future, the MMS Service Provider of the recipient deletes further MMs from this sender and such MMs are not offered to the recipient for downloading anymore. Hence, the recipient is no longer bothered by undesirable messages from the sender.

In a further exemplary embodiment it is assumed that the identity of the sender will not be imparted to the recipient, that the information element for the sender address is missing and that the request A is a response to the MM notification. After the MM has been received in the area of responsibility MMSE B of the MMS Service Provider B, first the abstract message 5 informs the recipient that there is an MM ready to be downloaded. There is no sender address in this notification as the sender expressed the wish for anonymity. However, the notification contains a reference (optional) and the URI (reference to the storage location of the MM, obligatory). Thereby, the abstract message 6 serves primarily as confirmation that the MMS UA B has received the notification correctly.

In this exemplary embodiment, the recipient recognizes from the subject or reference line that it involves a promotional offer that is of no interest to him/her and, therefore, the recipient sends a request A to his/her MMS Service Provider to have the address of the sender put on a black list, whereby the URI of the MM from the notification is used as identification signal I. The MMS Service Provider can ascertain the identity of the sender from the URI and put it on the personal black list of the recipient. In the future, the MMS Service Provider of the recipient deletes further MMs from this sender and such MMs are not offered to the recipient for downloading anymore. Hence the recipient is no longer bothered by undesirable messages from this sender.

In a further exemplary embodiment it is assumed that the recipient is not notified of the identity of the sender, that the sender address contains an alias name and that the request A is a response to the delivery of the MM. After the MM has been received in the area of responsibility MMSE B of the MMS Service Provider B, first the abstract message 5 informs the recipient that there is an MM ready to be downloaded. In this exemplary embodiment the notification also contains an alias name (e.g., Anonymous.Subscriber@XY.de") as sender address in addition to the URI (reference to the storage location). The abstract message 6 serves primarily as confirmation that the MMS UA B has received the notification correctly.

The recipient decides to download the MM on the basis of the information contained in the notification. The MMS UA B sends the abstract message 7 to the MMS R/S B to initiate the download of the MM. The MMS R/S B delivers the MM to the MMS UA B via the abstract message 8. In addition to the MM (i.e., the multimedia user data) an alias name (e.g., "Anonymous.Subscriber@XY.de") as sender address and a message ID for the MM are sent with the abstract message 8. The MMS R/S B can be informed of the successful outcome of the download via the abstract message 9 from the MMS UA B. If the recipient determines that his/her decision to download the MM was a mistake as, instead of useful information, the MM only contains offensive material, he/she can now direct a request A to his/her MMS Service Provider to have the sender address put on a black list, whereby the (obligatory) message ID of the MM from the abstract message 8 is used as identification signal I. The MMS Service Provider SP B can ascertain the identity of the sender from the message ID and put this sender on the personal black list of the recipient. In the future, the MMS Service Provider of the recipient deletes further MMs from this sender and such MMs are not offered to the recipient for downloading anymore. Hence, the recipient is no longer bothered by undesirable messages from the sender and no unnecessary data is sent via the air interface to the recipient B.

Several possibilities lend themselves to sending the request A from the MMS UA B of the recipient to the MMS R/S B of the MMS Service Provider SP B, these being described below.

The request A can be sent as a self-contained abstract message, which (in addition to other information) also contains the identification signal I as a self-contained information element. Other information could be, for example, further filter criteria, the statement of the corresponding list (e.g., private or public) or time limitations for the desired filter functionality.

Furthermore, the request A also may be sent as a self-contained information element in an already known abstract message defined by the 3rd Generation Partnership Project (3GPP); for example, in the so-called "MM1_notification.RES" (Ref. 6), "MM1_retrieve.

REQ" (Ref. 7), "MM1_acknowledgement.REQ" (Ref. 9) shown in illustration 5 or also in the abstract message "MM1_read_reply_recipient.REQ" (used to send a read confirmation of the recipient) not shown in illustration 5.

Finally, the request A also may be sent as user data within an MM that is ideally addressed to a service address of the MMS Service Provider for updating black lists.

Figure 1:
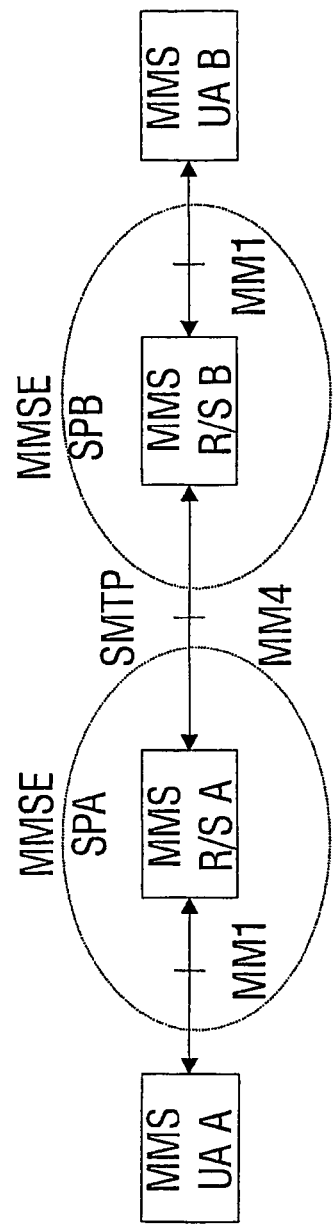
FIG. 1 shows an MMS network architecture.
Figure 2:
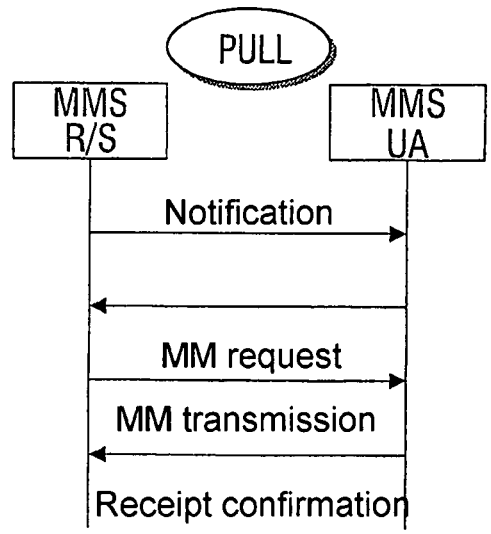
FIG. 2 shows a diagrammatic view of the Pull Mode.
Figure 3:
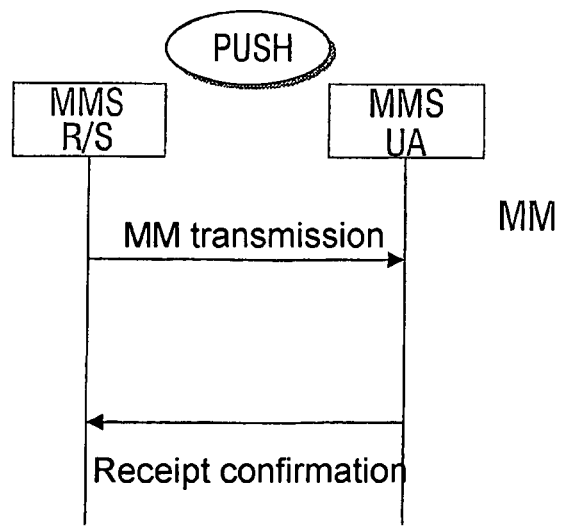
FIG. 3 shows a diagrammatic view of the Push Mode.
Figure 4:
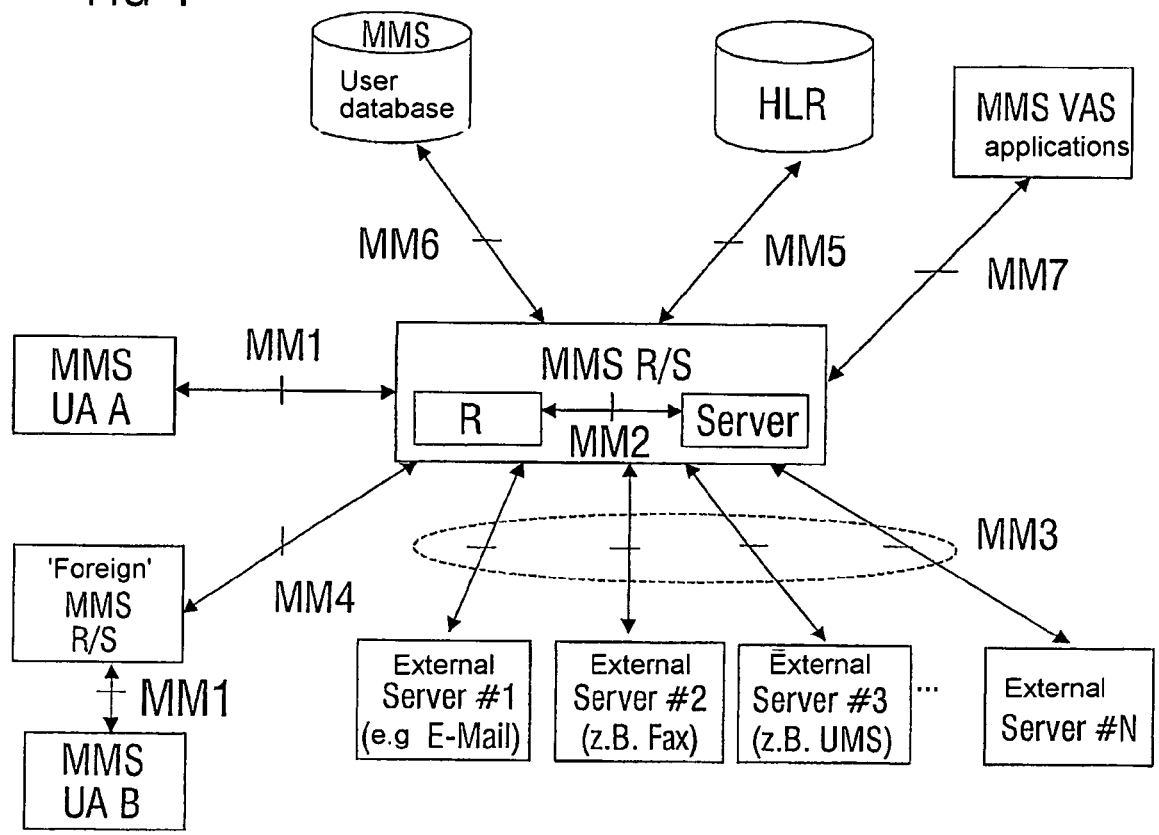
FIG. 4 shows a diagrammatic view of an MMS R/S and its interfaces.

The black list(s) preferably should be managed in the area of responsibility MMSE of the MMS Service Provider SP, so that the filter functionality is already effective before further MMs from the same sender are sent via the valuable air interface. Thereby, the black list can be incorporated as part of the MMS user database via the interface MM6 into the MMSE of the MMS Service Provider SP (cf. FIG. 4). Alternatively, however, the black list also may be managed on a separate computer or by the MMS R/S directly.

Although the present invention has been described with reference to specific embodiments, those of skill in the art will recognize that changes may be made thereto without departing from the spirit and scope of the present invention as set forth in the hereafter appended claims.

The invention claimed is:

1. A method for managing blocking of undesirable text or multi-media messages in a digital mobile radio system, the method comprising:
   receiving a digital text or digital multi-media message from a sender at a service provider wherein the digital text digital multi-media message includes a sender address information of the sender and wherein the sender requests to withhold the sender address information;
   transmitting a text or multi-media message available notification and an identification signal from the service provider to a recipient serviced by the service provider without providing the sender address information, the text or multi-media message available notification notifying the recipient that the digital text or digital multi-media message is ready for download by the recipient, wherein the identification signal is usable by the service provider, but not the recipient, for identifying the sender address information;
   in response to a receipt of the text or multi-media message available notification by the recipient, receiving a request from the recipient to the service provider, the request comprising at least the identification signal received by the recipient, the request indicating, to the service that the recipient wants to have the sender of the digital text or digital multi-media message put on a list of exclusions; and
   adding the sender to the list of exclusion based at least on the identification signal such that this digital text or digital multi-media message and further digital text or digital multi-media message available notifications from this sender will not be received by the recipient.

2. A method for blocking undesirable text or multi-media messages in a digital mobile radio system as claimed in claim 1, wherein the list of exclusions is managed by the service provider.

3. A method for blocking undesirable text or multi-media messages in a digital mobile radio system as claimed in claim 1, wherein the list of exclusions is a personal, individual list of exclusions of the recipient.

4. A method for blocking undesirable test or multi-media messages in a digital mobile radio system as claimed in claim 1, wherein the list of exclusions is a general list of exclusions that is taken into consideration for at least one of all recipients and groups of recipients.

5. A method for blocking undesirable text or multi-media messages in a digital mobile radio system as claimed in claim 1, wherein the request sent to the service provider includes a self-contained abstract message.

6. A method for blocking undesirable text or multi-media messages in a digital mobile radio system as claimed in claim 5, wherein the request sent to the service provider is integrated in the abstract message in the an information element form.

7. A method for blocking undesirable text or multi-media messages in a digital mobile radio system as claimed in claim 1, wherein the identification signal sent to the service is contained in user data of a digital Multimedia Message.

8. A method for blocking undesirable text or multi-media messages in a digital mobile radio system as claimed in claim 1, wherein the request sent to the service provider contains further information for the filter functionality, including at least one of a type of the list of exclusions and time limitations.

9. A system for managing blocking of undesirable text or multi-media messages in a digital mobile radio system, comprising:
   a service provider configured to:
      receive is digital text or digital multi-media message from a sender, wherein the digital text or digital multi-media message includes a sender address information of the sender and wherein the sender requests to withhold the sender address from delivery to a recipient;
      transmit a text or multi-media message available notification and an identification signal to the recipient served by the service provider, the text or multi-media message available notification notifying the recipient that the digital text or digital multi-media message is ready for download by the recipient, wherein the identification signal is usable by the service provider, but not the recipient, for identifying the sender address;
      receive, in response to a receipt of the text or multi-media message available notification by the recipient, a request from the recipient to add the sender to is list of exclusions, wherein the request comprises at least the identification signal received by the recipient with the text or multi-media message available notification; and
      based at least on the identification signal, add the sender to the list of exclusions such that the digital text or digital multi-media message is not received by the recipient;
      wherein the identification signal comprises:
         a text or multi-media message identification element; or
         a reference to a storage location of a text or multi-media message.

10. A system for blocking undesirable text or multi-media messages in a digital mobile radio system as claimed in claim 9, wherein the service provider manages the list of exclusions.

11. A system for blocking undesirable text or multi-media messages in a digital mobile radio system as claimed in claim 9, wherein the list of exclusions is a personal, individual list of exclusions of the recipient.

12. A system for blocking undesirable text or multi-media messages in a digital mobile radio system as claimed in claim 9, wherein the list of exclusions is a general list of exclusions that is taken into consideration for at least one of all recipients and groups of recipients.

13. A system for blocking undesirable text or multi-media messages in a digital mobile radio system as claimed in claim 9, wherein the request sent to the service provider is formed as a self-contained abstract message.

14. A system for blocking undesirable text or multi-media messages in a digital mobile radio system as claimed in claim 13, wherein the request sent to the service provider is integrated in the abstract message in an information element form.

15. A system for blocking undesirable text or multi-media messages in is digital mobile radio system as claimed in claim 9, wherein the request sent to the service provider is contained in user data of a digital Multimedia Message.

16. A system for blocking undesirable text or multi-media messages in a digital mobile radio system as claimed in claim 9, wherein the request sent to the service provider contains further information for filter functionality, including at least one of a type of the list of exclusions and time limitations.

17. A method for managing the blocking of undesirable text or multi-media messages in a digital mobile radio system, the method comprising:
  receiving a digital text or digital multi-media message from a sender at a service provider, wherein the digital text or digital multi-media message includes a sender address information;
  transmitting the digital text or digital multi-media message and an identification signal from the service provider to a recipient serviced by the service provider without providing the sender address information, wherein the identification signal comprising an alias name for the sender address information wherein the alias name renders the sender anonymous, wherein the identification signal is usable by the service provider, but not the recipient, for identifying the sender address information;
  in response to a receipt of the digital text or digital multi-media message and the identification signal by the recipient, receiving a request from the recipient to add the sender to a list of exclusions, wherein the request comprises at least the identification signal; and
  adding the sender to the list of exclusion based at least on the identification signal such that this digital text or digital multi-media message and further digital text or digital multi-media message available notifications from this sender will not be received by the recipient.

18. A system for managing blocking of undesirable text or multi-media messages in a digital mobile radio system, comprising:
  a service provider configured to:
  receive a digital text or digital multi-media message from a sender, wherein the digital text or digital multi-media message includes a sender address information;
  transmit the digital text or digital multi-media message and an identification signal to a recipient served by the service provider without providing the sender address information, wherein the identification signal comprising an alias name for the sender address information wherein the alias name renders the sender anonymous, wherein the identification signal is usable by the service provider, but not the recipient, for identifying the sender address information;
  receive, in response to a receipt of the digital text or digital multi-media message and the identification signal by the recipient, a request from the recipient to add the sender to a list of exclusions, wherein the request comprises at least the identification signal; and
  add the sender to the list of exclusion based at least on the identification signal such that this digital text or digital multi-media message and further digital text or digital multimedia message available notifications from this sender will not be received by the recipient.

* * * * *